United States Patent [19]

Mason et al.

[11] 3,925,760

[45] Dec. 9, 1975

[54] METHOD OF AND APPARATUS FOR OPTICAL CHARACTER RECOGNITION, READING AND REPRODUCTION

[75] Inventors: Samuel J. Mason, Jamaica Plain; Donald E. Troxel, Belmont; William F. Schreiber, Lexington, all of Mass.

[73] Assignee: ECRM, Inc., Bedford, Mass.

[22] Filed: June 7, 1973

[21] Appl. No.: 367,950

Related U.S. Application Data

[63] Continuation of Ser. No. 140,830, May 6, 1971, abandoned.

[52] U.S. Cl. .............. 340/146.3 ED; 340/146.3 AE

[51] Int. Cl.[2] ............................................ G06K 9/16

[58] Field of Search.................340/146.3 R, 146.3 F, 340/146.3 ED, 340/146.3 H, 172.5; 178/6.8, 7.2

[56] References Cited

UNITED STATES PATENTS

| | | | |
|---|---|---|---|
| 3,234,327 | 2/1966 | McMann, Jr. | 178/6.8 |
| 3,264,610 | 8/1966 | Rabinow | 340/146.3 ED |
| 3,475,555 | 10/1969 | McMann, Jr. | 178/6.8 |
| 3,539,715 | 11/1970 | Lemelson | 178/6.6 A |
| 3,611,291 | 10/1971 | Frank | 340/146.3 Z |
| 3,676,856 | 7/1972 | Manly | 340/172.5 |

*Primary Examiner*—Leo H. Boudreau
*Attorney, Agent, or Firm*—Rines and Rines

[57] ABSTRACT

This disclosure deals with a novel technique for optical character recognition, reading and reproduction that involves scanning a plurality of contiguous sub-areas of sheets of character-information-containing media, such as typed or printed paper; locating and recognizing characters upon those sheets and in an order generally unrelated to the reading sequence of the characters; and producing an output in the form of a coded symbol stream collated and reassembled into the desired reading sequence for application to a typeset computer interface, a punched or magnetic tape apparatus or other output character-reproducing device.

1 Claim, 16 Drawing Figures

SAMUEL V. MASON
DONALD E. TROXEL
WILLIAM F. SCHREIBER
INVENTORS

BY Rines and Rines

SAMUEL V. MASON
DONALD E. TROXEL
WILLIAM F. SCHREIBER
INVENTORS

BY Rines and Rines

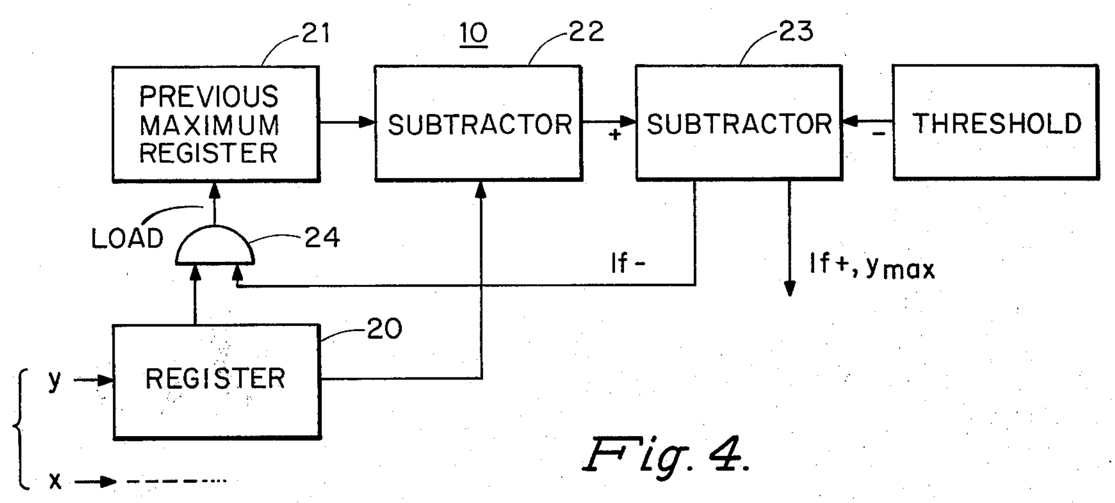
Fig. 4.
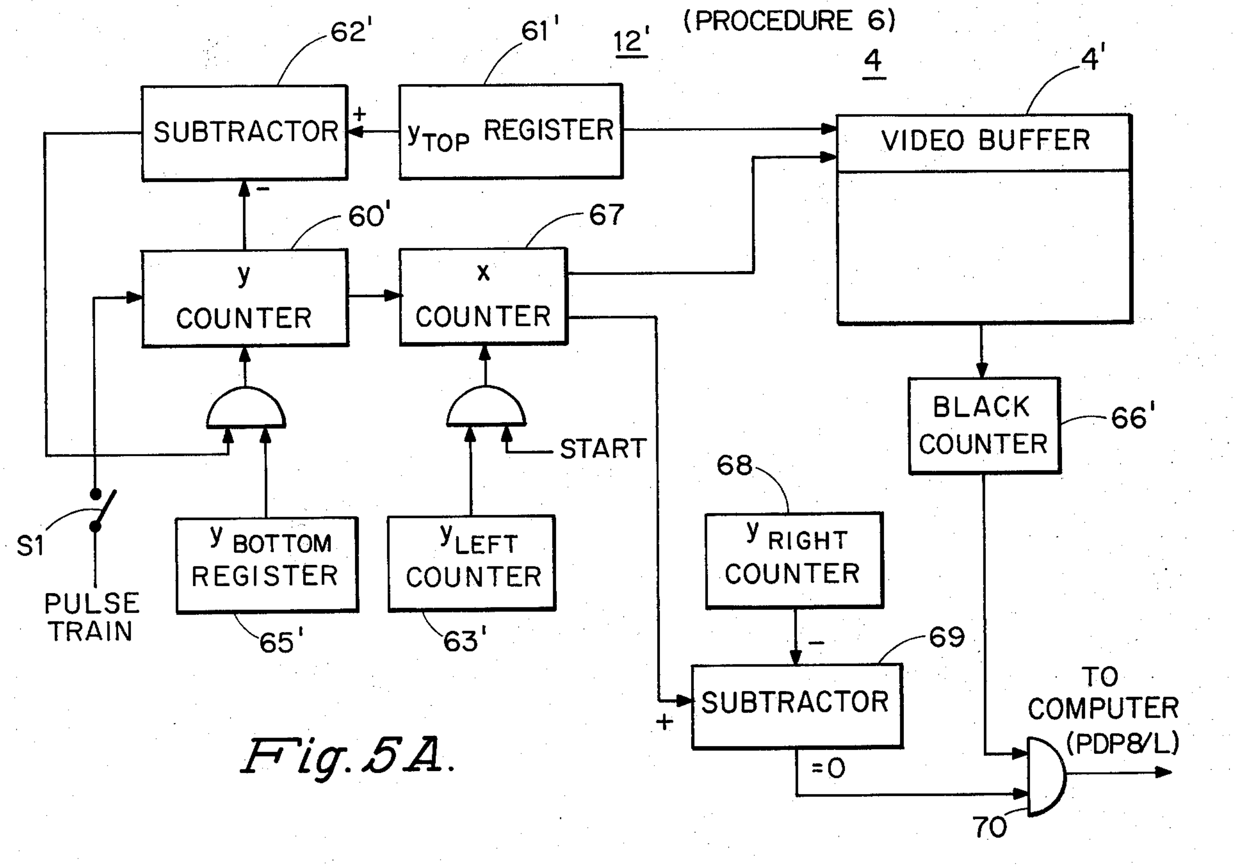
Fig. 5A.
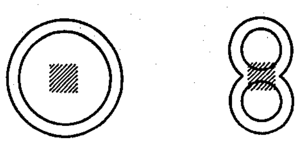
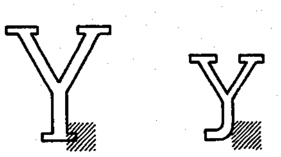
Fig. 5B. Fig. 5C.
SAMUEL V. MASON
DONALD E. TROXEL
WILLIAM F. SCHREIBER
INVENTORS
BY Rines and Rines

SAMUEL V. MASON
DONALD E. TROXEL
WILLIAM F. SCHREIBER
INVENTORS

BY Rines and Rines

SAMUEL V. MASON
DONALD E. TROXEL
WILLIAM F. SCHREIBER
INVENTORS

BY [signature]

SAMUEL V. MASON
DONALD E. TROXEL
WILLIAM F. SCHREIBER
INVENTORS

BY Rines and Rines

METHOD OF AND APPARATUS FOR OPTICAL CHARACTER RECOGNITION, READING AND REPRODUCTION

This is a continuation of application Ser. No. 140,830, filed May 6, 1971, now abandoned.

The present invention relates to optical character recognition methods and apparatus, being more particularly, though not exclusively, directed to such apparatus that is adapted for enabling the automatic reading of typed, printed or other information-carrying media, generically referred to hereinafter as "sheets" containing successive lines of "character" information.

The art is replete with numerous different types of apparatus evolved over several decades for reading and recognizing informaion, ranging from simple, template-comparison applications, to more recent sophisticated optical scanning devices for electronically converting the written information into digital data that then may be transmitted and reproduced. This invention, however, is primarily concerned with apparatus of the type that accepts and scans sheets of paper or other media carrying characters disposed in a predetermined intended reading sequence, locates and recognizes the characters on the sheets, and produces output in the form of coded symbols for application to a typeset computer interface, or onto punched-paper or magnetic tape, or some other apparatus enabling character reproduction.

Among the more germaine systems from the viewpoint of this invention are, for example, the IBM Optical Page Reader Type 1975, described at pp. 346–371 of IBM Journal of Research & Development, Vol. 12, No. 5, 1968, and an optical reader developed at the Massachusetts Institute of Technology and described in Quarterly Report No. 94 of the Research Laboratory of Electronics of that Institute, dated July 15, 1969, and the references therein cited, part of which has been reproduced at pp. 155–167 of "Recognizing Patterns", by P. A. Kolers and M. Eden, M.I.T. Press, 1968. These systems are, however, subject to certain inherent disadvantages which it is an object of the present invention to overcome. First, the nature of the techniques employed in such systems, imposes the severe restriction that the identification or recognition of characters must be effected in the precise reading sequence that they occupy on the sheet — and this, whether or not this would be the most efficient or rapid or most costly system in terms of required scanning or digital data storage and processing equipment. More than this, the line or spot scanning of such systems requires precise registration of the line-by-line scanning paths with the successive lines of character information, necessitating extensive alignment procedures and ancillary apparatus, and limiting the flexibility of use with sheets containing character lines that may be somewhat skewed.

An object of the present invention, accordingly, is to provide a new and improved character recognition and reading method and apparatus that shall not be subject to such disadvantages and limitations, but that, to the contrary, enable great flexibility in selection of scanning system (not dictated by the character-reading sequence) and in tolerance to unaligned and skewed lines of character information.

A further object is to provide such an improved apparatus with greatly reduced storage and processing equipment; and thus, because of reduced cost, more adapted to a larger number of commercial uses.

Still another object is to provide a novel optical character recognition, reading and reproducing system that enables any or all of facile automatic editing, interlineations and post-editing processing with the same systems components.

Other and further objects will be explained hereafter and are more clearly delineated in the appended claims.

In summary, however, from one of its broad aspects, the invention contemplates a novel method of and apparatus for character recognition and reading of successive lines of character information contained on a sheet in a predetermined reading sequence, that comprises, optically scanning a plurality of contiguous sub-areas of the sheet of dimensions large compared with a line width; recognizing individual characters and portions thereof during the scanning of each sub-area and geometrically locating the same on the sheet and in an order generally unrelated to the said reading sequence of the characters on the sheet; storing the recognized and located character information as coded symbols; and collating the stored character information into a coded symbol stream reassembled into the said reading sequence. Preferred details and subcombinations are hereinafter more particularly described.

The invention will now be described with reference to the accompanying drawings, FIG. 1 of which if a block diagram of a preferred embodiment;

FIG. 4 is a block diagram of a form of extrema generator suitable for use in system of FIG. 1;

FIG. 5A is a similar diagram of a useful character identification system for performing this function in the system of FIG. 1, and FIGS. 5B and 5C are explanatory diagrams of the operation thereof;

Figure 1:
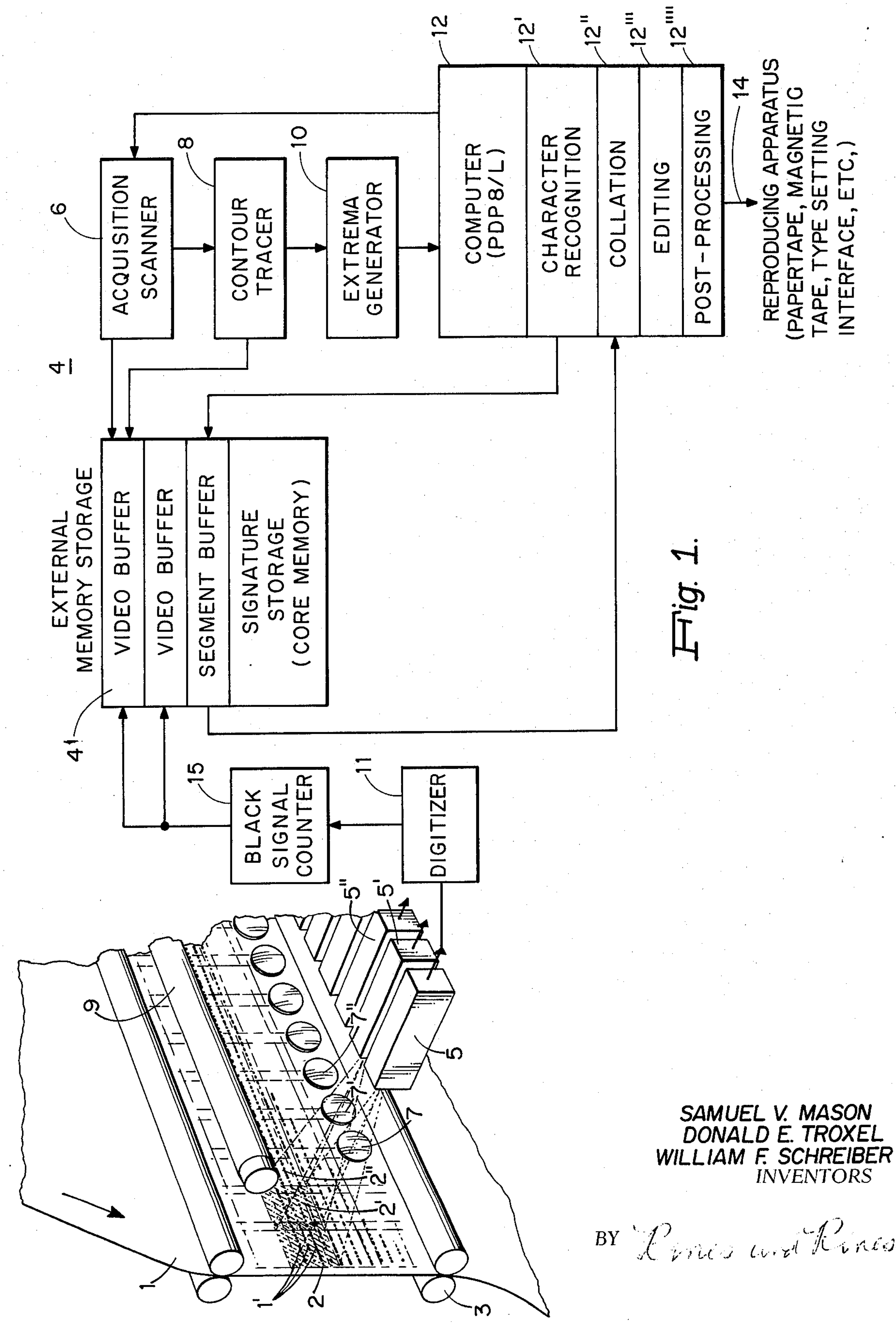
Figure 6A:
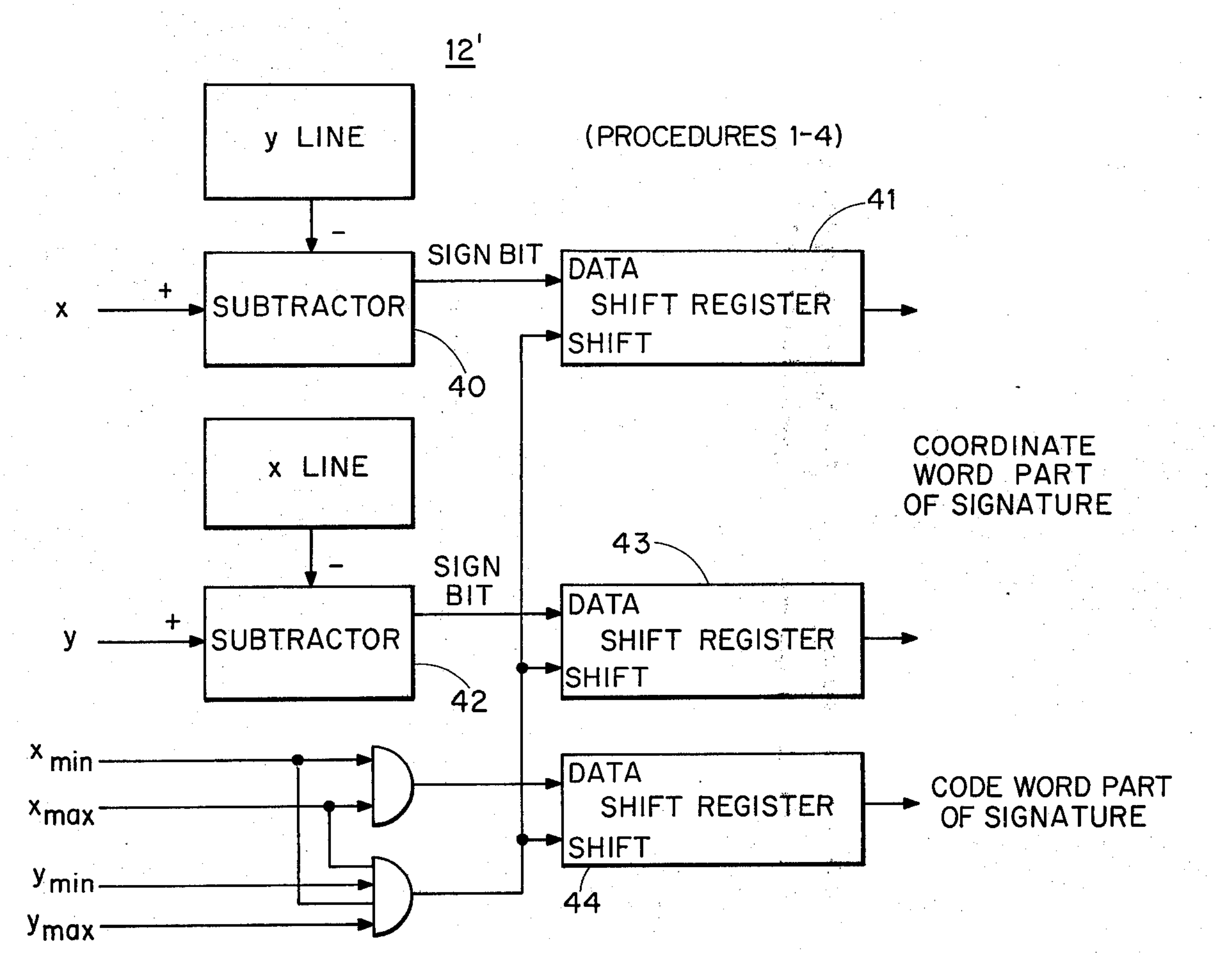
Figure 6B:
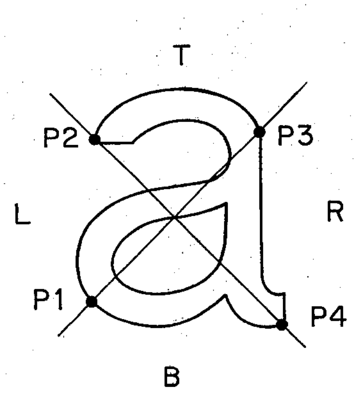
Figure 6C:
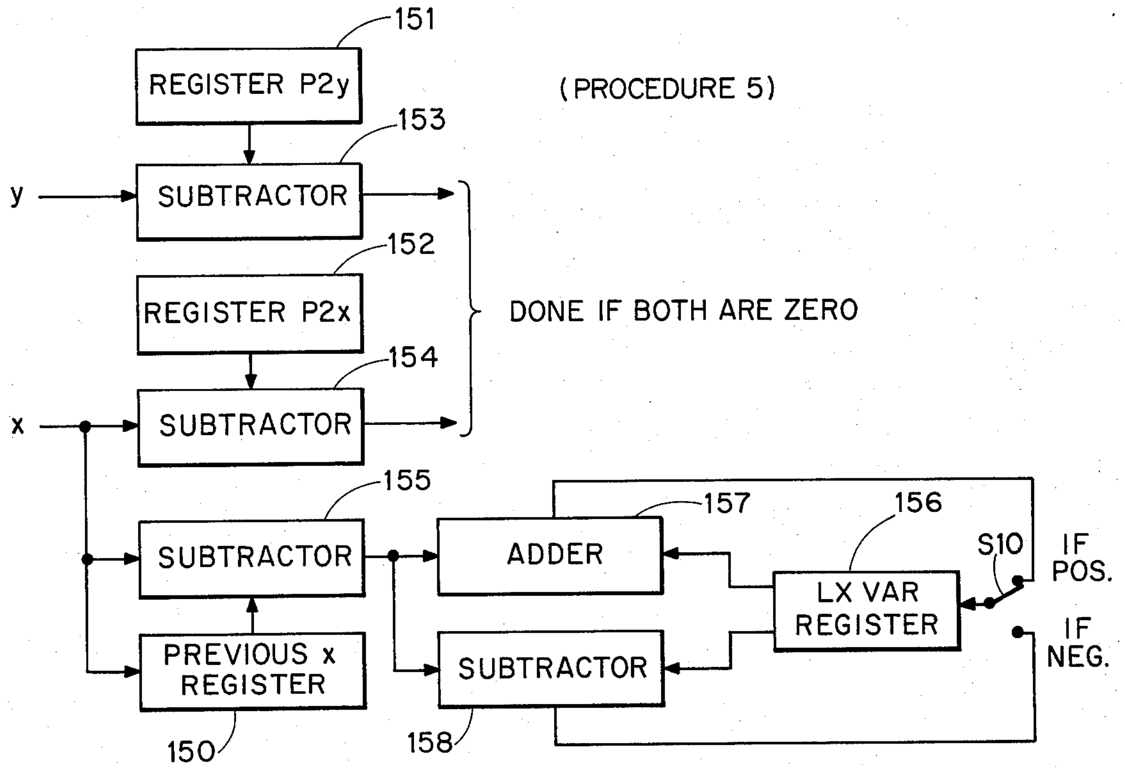
Figure 7:
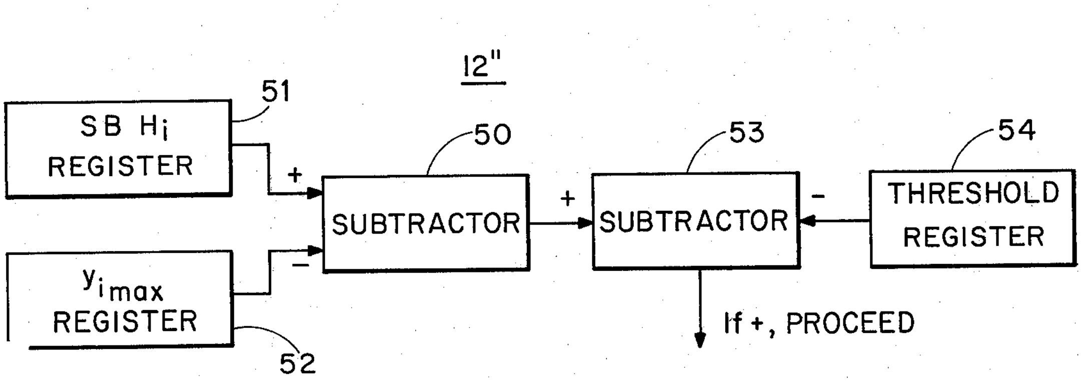
Figure 8:
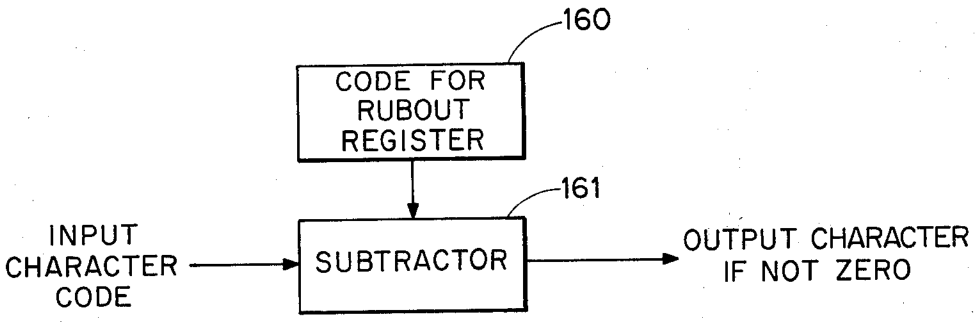
Figure 8A:
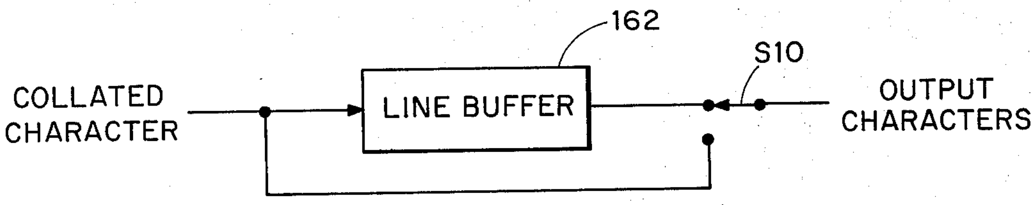
Figure 9:
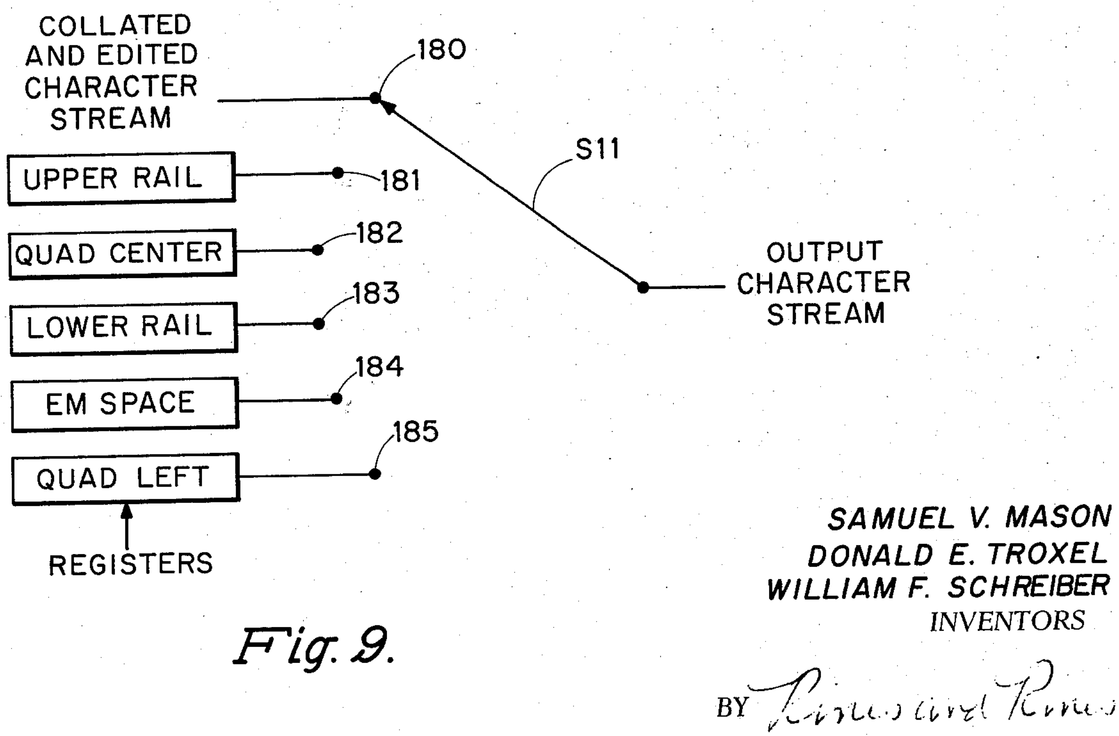

FIGS. 6A, 6C and 7 are similar diagrams showing possible character-recognizing and code signature-producing techniques and collating techniques, respectively, performing such functions as intended in the computer of FIG. 1, FIG. 6B being a sketch explanatory of the character coordinate determination; and FIGS. 8, 8A and 9 are block diagrams of portions of post-processing apparatus suitable for use in the system of FIG. 1, if desired.

Referring to FIG. 1, a sheet 1 containing vertically spaced horizontal lines of characters 1′, in a predetermined reading sequence, is shown driven by rolls 3 in one direction (downward) past a scan region illuminated by one or more shielded lamps 9. A plurality of optical scanners 5, 5′, 5″, etc., preferably though not always essentially of the vidicon type, it positioned opposite the scan region, focused by respective lens systems 7, 7′, 7″, etc. upon contiguous corresponding sub-areas 2, 2′, 2″, etc. of the sheet 1, each of vertical and horizontal dimensions much larger than the width of a single line 1′ and thus containing a plurality of such lines, but of horizontal dimension less than the length of the lines.

In a preferred mode, in order to insure that characters partially extending outside a lateral border of a sub-area are not missed, the sub-areas 2, 2′, 2″, etc. scanned by the respective vidicons with their appropriate scanning circuits 5, 5′, 5″, etc., are caused to be slightly overlapped. Other types of scanners, including laser-controlled devices, may also be employed if consonant with the digitizer circuitry schematically represented at 11, which converts the television-like scanned images into digitized signals representative thereof, in conventional fashion. When sufficient black character information is recognized on the typed or printed sheet 1, the signals are fed to video buffers 4' of an external or separate memory storage system 4, as of the core or other well-known type. A black signal counter 15 for indicating that the scanned information includes character data (i.e. has black information) and causing input to the video buffer 4' at such time, may be, for example, of the type SN7493 described in "TTL Integrated Circuits From Texas Instruments", Bulletin CB-102, 1969.

The order of multiple contiguous sub-area scanning, simultaneously (or in parallel), sequentially, or in a combination thereof, is, of course, unrelated to and not in the predetermined reading sequence of character-after-character completely across each line 1'. The invention thus enables flexibility of scanning pattern for design considerations without being restricted, as in the systems before-described, to the reading sequence.

The advantages of this sub-area, patch-by-patch examination, as contrasted with the aligned line-by-line scan in the reading sequence of the prior art, are several fold in addition to the removing of the restrictions of the specific reading sequence. They include the fact that relatively low resolution scanners may be employed, that precise location of the sheet in the optical path is not required, that both skew of the print and of the paper can be tolerated, and that the paper handling, optics and memory storage can be simplified, including the use of simple sheet feed mechanisms. Had the line type of scan been employed and had a line of characters been skewed, it would have been necessary to scan an area represented by a thin rectangle containing, as a diagonal, the skewed character line. In the multiple sub-area system of the invention, however, much smaller rectangular areas containing successive segments of the character line need be scanned, thus considerably reducing the amount of external memory circuits required — and this altogether apart from the necessary paper and line-alignment procedures inherently required by line scanners.

By using the black signal counter 15, only the information in the regions of the characters will be loaded into the video buffer 4', automatically by-passing blank areas. In accordance with the invention, digital circuits are employed in an acquisition scanner 6 connected with the storing video buffer 4' to search for the black-character areas and, when found, to cause a contour tracer 8 to trace the contour of such black areas and indicate and at least partially recognize the character. This causes an extrema generator 10 to determine the geometrical location or X–Y coordinates of the traced character through a determination of the extreme limits thereof. In FIG. 1, a conventional computer 12, such as a DEC-PDP8/L may be used to store the signals representing the contour nature and coordinates of the character and/or to store the same in segment and signature storage parts of the external core memory, if desired. To complete the character recognition, the contour and coordinate information must be compared with a known list of characters so as to provide a sample signature having a code word part corresponding to the identified character and a coordinate part representing its geometrical location on the sheet.

Apparatus has been constructed and successfully operated in accordance with the techniques underlying the invention, performing this function by well-known types of programming procedures in the computer 12. In order more facilely to describe the operation, however, this function is schematically represented by the block 12', labeled "character recognition", in the computer 12 of FIG. 1, embodying circuits that may be as shown in FIGS. 6A, 6C and 5A, as later described. These are just one way to accomplish the desired functions, as distinguished from rather straight-forward programming techniques in the computer 12, or using other well-known digital circuitry. For present purposes, suffice it to state that there results from the character recognition function 12', a catalog of coded symbols representing a list of character codes and the X and Y coordinates thereof, transferred in successive fillings of the video buffer 4' when the process is initiated; the process repeating until the complete sheet is finished, and deactivating until another sheet is in place. These logical operations and other functions later described, however, as before indicated, may be performed by "software" techniques or "hardware", depending upon the particular application and its economic, speed and other considerations.

Once the signature storage of the system 4 contains the coded symbols representing the list of characters and coordinates of the scanned sub-areas, it is then necessary to reconstitute the page by reassembling the characters in their respective geometrical locations, thus to provide a coded symbol stream corresponding to the collation of the stored character information in the original reading sequence, thus to reproduce the original information on the sheet 1. This process may be done by feeding the reassembled or collated coded symbol stream, as shown at 14, to, for example, paper or magnetic tape apparatus or a type-setting interface for providing type that will enable printing of the information originally contained on the sheet 1. The collation function is represented by the block 12'' in the computer 12 which, in the commercial apparatus embodying the invention, is again achieved by the programming of the computer 12, but which, for purposes of ease of explanation and understanding, is illustratively represented as effected by circuits of the type shown in FIG. 7, or equivalent digital circuits, as hereinafter discussed.

The invention also provides for automatic editing functions, as at 12''' in the computer 12, for deleting editing lines in the text at 1 and inserting revisions indicated in the text just below or above the line into the coded symbol stream. While, once more, programming of the computer 12 can achieve this function, a simple digital circuit for effecting the same is shown in FIG. 8, later described. Post processing functions, indicated at 12'''' may again be programmed, or may be achieved by digital circuitry, for example, of the type shown in FIG. 9, as hereinafter discussed, in order to impart into the output coded sample stream at 14 command signals for type selection functions, punctuation or other similar purposes.

Figure 2A:
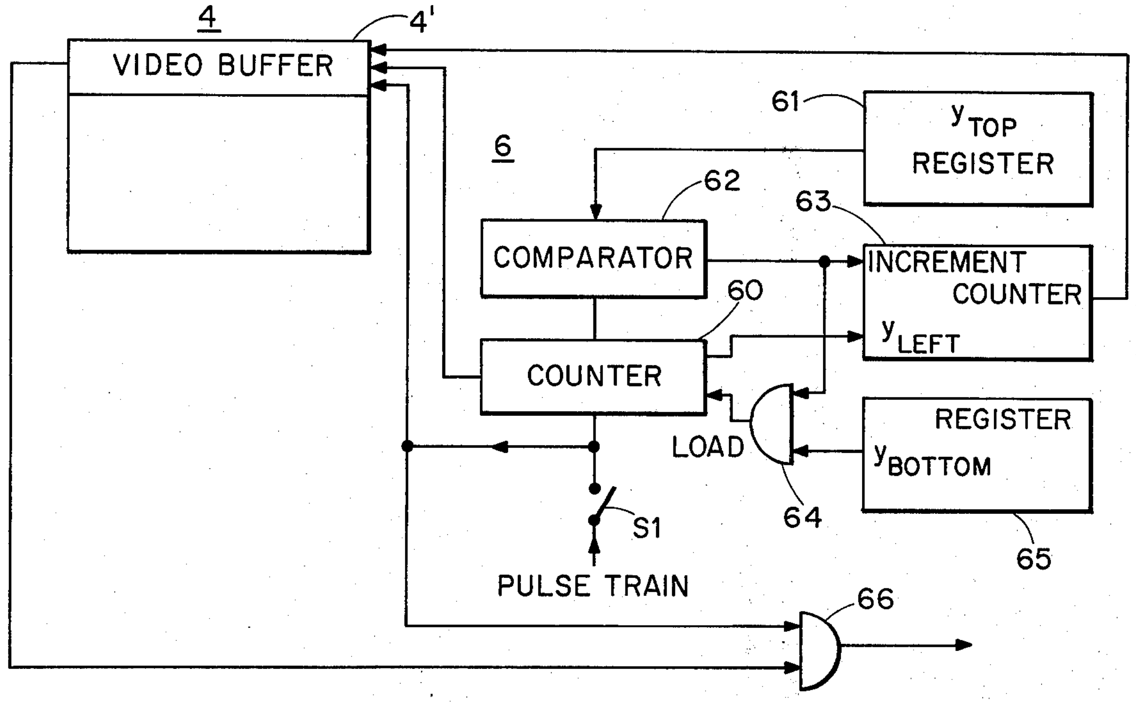
FIG. 2A is a similar block and partial schematic diagram of the acquisition scanner of FIG. 1.
Figure 2B:
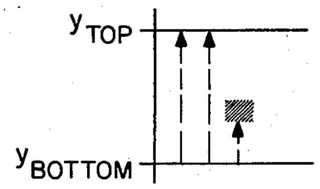
FIG. 2B is an explanatory scan diagram therefor.

It now remains to explain how some of the functions above-described can be attained in order more fully to provide an explanation of the operation of the invention. In FIGS. 2A and 2B, the function of the acquisition scanner 6 is illustrated. It is desired to scan the stored data in the video buffer 4' for the first black character portion, illustrated in FIG. 2B as the area between the $Y_{top}$ and $Y_{bottom}$ horizontal lines to the right of the illustrated solid vertical line position. The acquisition scanner scans the signals stored in the video buffer 4'- fed from the digitizer 11 in FIG. 1, to seek out the first black signal information, trying first the left-most vertical dotted line to the right of the solid vertical line, along which it does not find a black area. The search continues along the next dotted vertical line to the right, similarly representing stored data scanned that is void of a black area. On the third scan, the black area is reached at a point between $Y_{bottom}$ and $Y_{top}$. At this time of detection of a character stored in the video buffer 4', the acquisition scanner 6 then triggers the contour tracer 8 to trace this character. One way in which the acquisition scanner 6 may produce this function is shown in FIG. 2A with the aid of simple digital counters and registers as, for example, in the configuration shown. A first counter 60 receives signal pulses labeled "pulse train" when a scan is to be effected, schematically illustrated by the closing of switch S1, and storing counts in the counter 60 connected with the stored digital data in the video buffer 4'. The position of the $Y_{top}$ at this time is represented by what is stored in the $Y_{top}$ register 61, and this information is applied as an input to a comparator 62, receiving as its other input, the output of the counter 60. The comparator output is used to increment a "$Y_{left}$" increment counter 63, the output of which is applied to the video buffer 4' to move successive scans of the stored data successively to the right in increments, as before described. The counter 60 is loaded from a gate 64 to which the output of a $Y_{bottom}$ register 65 and the output of comparator 62 are applied only when the successive searching or scanning reaches the black character, as in FIG. 2B. When this occurs, the combination of the scanning pulse train and the signals from the video buffer 4', as applied to the adder 66, produces an output that activates the contour tracer 8 into commencing the tracing of the detected character. Further conventional details of the operation of the counters, registers, buffers and other well-known circuits is not given because this is so well known in this art, and it is considered that such details would only complicate and unnecessarily detract from the description of the essential features of novelty; but it is to be understood that the conventional interconnections and ancillary equipment is to be considered as incorporated, as is well known. As an example, the counters 60 and 63 may be of the type SN7493 described in said Texas Instruments Bulletin CB-102; the registers 61 and 65 may be of the type SN7475 described in said Bulletin; the comparator may be of the type 7483 also therein described; and the video buffer 4' may be of the Fabritek core memory type or model 480 described in Fabritek Publication No. 400 0098-00, August, 1970. Clearly, other types of well-known circuits of this character may also be combined to achieve the described functions, as is within the knowledge of those skilled in this art. As another example, the acquisition scanner 6 may assume the form described in the same Massachusetts Institute of Technology Quarterly Report 94 and the articles referenced therein.

Figure 3B:
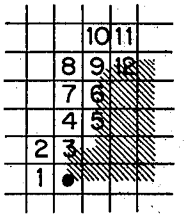
FIG. 3B is an explanatory pattern of the operation thereof.
Figure 3A:
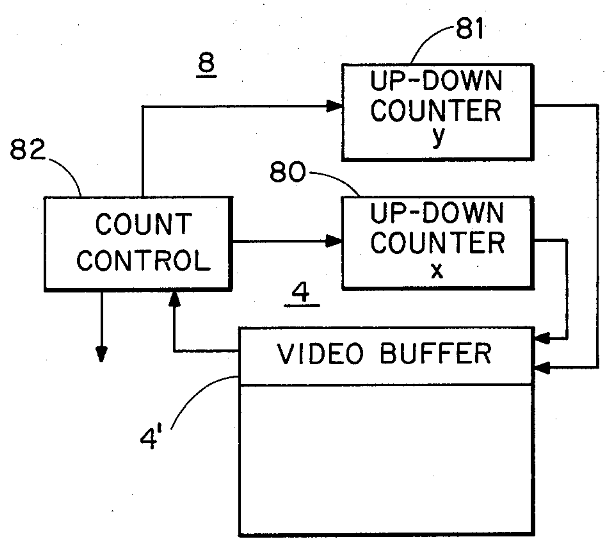
FIG. 3A is a similar diagram of a contour tracer usable in the system of FIG. 1.

The contour tracer 8 thus activated by the acquisition scanner 6 may assume the general form shown in FIG. 3A, for performing the function illustrated in FIG. 3B. A part of such a character is shown for illustration purposes in the shaded block of FIG. 3B, the contour of which is to be traced from the lower left-most point. A grid of horizontal and vertical lines is superimposed to illustrate the successive increments of spaces that may be traced from one through 12, defining the left-most contour of this part of the character. This may be effected by the type of circuit illustrated in FIG. 3A wherein two up-down counters 80 and 81 are employed for each of the X and Y directions. Each counter is connected with the video buffer 4', in effect to move up and down the black contour, as in FIG. 3B, under the count control (which may assume the form of the said Texas Instruments type 7493 or the like). The output thereof is a signal representative of the contour characteristic of the traced character. The contour tracer may also assume the form described in the said Massachusetts Institute of Technology Quarterly Report 94, or the form used in connection with the said IBM 1975 Reader described in the said IBM Journal.

The coordinates of this traced character are ascertained, as before described, by the extrema generator 10, one form of which is illustrated in FIG. 4 in connection with the Y coordinate, though it is to be understood that this will be replicated for the X coordinate, as well. The Y-coordinate signal is applied to a register 20 the output of which is subtracted from that of the previously stored maximum Y position in register 21. The subtractor circuit 22 may, for example, be of the type SN7483 described in the said Bulletin CB-102, and its output is compared in a further subtractor 23 with a predetermined threshold value. If the output of 23 is negative, meaning that the position of the traced contour is not at a Y value greater than previously traced, it is fed to a gate 24, also fed from register 20 to load the register 21. If, however, a positive output results from the subtractor 23, a new $Y_{max}$ or extreme point of the contour has been detected. Alternatively, an extrema generator of the type described in the said Quarterly Report and the references therein, or other similar circuits may also be employed.

While, as before stated, the final character recognition from the data obtained by the contour tracer 8 and the extrema generator 10 may be effected by functions programmed into the computer 12 in well-known fashion, in order to determine what character has been contoured, it is illustrated as effected by exemplary circuits in FIGS. 6A, 6C and 5A to aid in the description. The character recognition function, in accordance with a preferred embodiment, involves six procedures, as follows:

TABLE I

Procedure 1

1. On receipt of the contour signal from tracer 8, retrace the contour with the threshold of FIG. 4 at one-fourth the height and one-fourth the width of the full character.
2. Produce a "signature" or code symbols from this.
3. Determine if this corresponds uniquely to one of the known character symbols in the computer list.
   a. If yes — operation done.
   b. If no — proceed to Procedure 2, below.

Procedure 2

Same as procedure 1, but omitting retrace of step 1 and substituting adding height and width classification. If no in step 3, proceed to Procedure 3.

Procedure 3

Same as Procedure 1 except for smaller trace with threshold at one-eighth height and one-eighth width. If no in step 3, proceed to Procedure 4.

Procedure 4

Same as procedure 3 but, in FIG. 4 use X + Y and X − Y extrema inputs such that "signatures" have X, Y, X + Y, X−Y data (where X is the total movement in the X direction in tracing all parts of the contour, and Y has a similar definition). If no in step 3, proceed to Procedure 5.

Procedure 5

From a vector table stored in the computer, find the closest vector to that determined for the character. If no unique answer, proceed to Procedure 6.

Procedure 6

1. Make a partial template test of the character in the video buffer 4' of external memory 4.
2. Make best guess as a result of step 1.

Suitable circuits, as distinguished from the application of conventional programming techniques in computer 12, are shown in FIG. 6A for Procedure 1 (and thus with obvious modifications for Procedures 2 through 4), in FIG. 6C for Procedure 5, and in FIG. 5A for Procedure 6. Referring to FIG. 6B, the letter *a* is shown positioned centrally relative to $X_{line}$ and $Y_{line}$ axes (horizontal and vertical lines, respectively, not shown, through the center of the character or a circumscribing rectangle). Recognition of the *a* is to be effected and identification of the X and Y coordinates. Intersecting diagonals P1–P3 and P2–P4 are shown dividing the character in FIG. 6B into top (T), bottom (B), left (L) and right (R) quadrants. The X, Y, $X_{min}$, $X_{max}$, $Y_{min}$, $Y_{max}$ inputs obtained as a result of contour tracing at 8 and extrema generation at 10, before discussed, are applied to conventional digital circuits as follows. The X and Y inputs are compared in respective subtractors 40 and 42 with the $X_{line}$ and $Y_{line}$ inputs, with the sign bit results applied to the data input of shift registers 41 and 43, as, for example, of the type SN7495 described in the said Bulletin CB-102. The shift inputs to the registers 41 and 43 are obtained from the composite extremes $X_{max} - X_{min}$ and $Y_{max} - Y_{min}$, producing output symbols from registers 41 and 43 which are the coordinate or geometrical location word part of a "signature". The symbol representing the code word part of the signature identifying the character results from the shift register 44.

If the digital signature generated from the abovedescribed contour tracing, finding the extrema, and measuring character height and width fails to provide identification of the character in the computer-stored list or dictionary of characters, as set forth in Procedures 1 through 4, then a vector may be generated corresponding to the character, and this may be compared with a list of vectors also stored in the computer to make an identification of the character, as provided for in Procedure 5. This operation may, for example, be effected with logic circuits of the type shown in FIG. 6C, wherein registers 151 and 152 (Y and X values of point P2 in FIG. 6B) feed subtractors 153 and 154, which respectively receive the Y and X inputs, as well. If the subtractor outputs are both zero, the procedure is done; otherwise, subtractor 155 compares the X input with the input from a register 150 corresponding to the previous X value. The output of subtractor 155 feeds both an adder 157 and a further subtractor 158, also fed the output of an $L_{X\ var.}$ register 156 that is controlled respectively from either the adder 157 or the subtractor 158 depending upon whether the switch S10 is in its upper or lower positions. This operation thus enables a general vector corresponding to the character to be generated, which, if identified with a known computer-stored vector, enables character identification. The registers and subtractors of FIG. 6C may, for example, assume the forms of the said types SN7475 and 7483, or other well-known types of logical circuits for performing vector generation and comparison.

Should the vector recognition approach of Procedure 5 fail to enable identification, however, resort may be had to a partial template comparison at those portions or regions where differences in characteristics are most distinctive, under the provision of Procedure 6. As an example, a small rectangular area at the center of an 0 and an 8, may be monitored (FIG. 5B), or the lower right-most corner of a capital and a small-case Y, (FIG. 5C). The type of registers and counters of the circuit of FIG. 2A are employed as exemplary in FIG. 5A, with prime notations, as at 60' through 66', with an X counter 67 and a $Y_{right}$ counter 68 also employed. The subtractor 69 obtains the differences between the X counter and $Y_{right}$ counter outputs and operates upon the gate 70 together with the black counter output from 66', producing a signal representative of the signal within the monitored predetermined X and Y limits of the partial templating rectangles of FIGS. 5B and 5C. Thus a determination of whether the traced item is, for example, an 0 or an 8 (or a capital or small Y) is guessed at. Again other types of circuits may similarly be employed.

It should be noted that the invention provides a plurality of recognition-comparison techniques in the event that the character cannot initially be recognized. First, successively smaller contouring and the other steps of Procedures 1 through 4 (FIG. 6A); second, the closest vector of Procedure 5; (FIG. 6C); and lastly, at least partial templating as in Procedure 6 (FIG. 5A). The first set of recognition techniques has negligible error for a large number of alphabet characters (over 80%); whereas the closest vector technique of Procedure 5 has its least error with the tails in letters, as caused by defective typewriters and the like, and in those cases where most errors or difficulties occur with the first set of techniques. Thus, substantially 100% recognition is achieved by the use of all sets of techniques and with negligible error.

Alternatively, the computer 12 may be provided with a program such as that disclosed in said Quarterly Report and the references cited therein to perform this character recognition function.

It now remains to explain the collation at 12' of the list of character and coordinate signature symbols stored, in this illustration, in the "signature storage" portion of the external memory 4. The collation operation involves the following procedures:

TABLE II

1. If the difference between the highest Y segment in all the segment buffers of 4 storing the digitized images from all the vidicons 5, 5', 5'', etc. (represented as $SB_{HI}$) and the highest Y of all such image signals is greater than a predetermined threshold, collation may commence.

2. If the difference between the highest segment buffer signal $SB_{Hi}$ and that ($SB_{Hj}$) of the next adjacent vidicon is greater than a line spacing, then such will be ignored for the present; if not, then $SB_{Hj}$ is on the same line as $SB_{Hi}$.
3. Iterate 2 for all vidicons (vertical columns), giving $SB_{Hi}$ for all vidicons for a line of print.
4. If this line's Y-position is lower than the previous $Y_{line}$ by at least one-half a line spacing, output the line; otherwise, discard.
5. If the first character of $SB_{Hi}$ is at least one-half the character space to the right of the last character of the line, output it; otherwise, not.
6. Iterate 5 for remaining vidicons, then back to step 1.

While these steps may readily be programmed in computer 12, as before explained, basic illustrative circuitry for performing these logic functions is shown in FIG. 7. Step 1, above, may be attained, for example, by subtracting at 50 the outputs of an $SB_{Hi}$ register 51 and a $Y_{i\ max}$ register 52. The output of 50 will, in turn, be compared in subtractor 53 with the desired output of threshold register 54. Step 2, above, may be performed with the same type of circuit except the $Y_{i\ max}$ register 52 is replaced by a $SB_{Hj}$ register and the threshold register 54 is adjusted to one-half the line spacing. Step 3 may be achieved as was step 2, except the previous Y position and present Y position inputs at the respective registers are employed. Step 4 is attainable with the same circuit as step 1 (FIG. 7), except the previous character position data is substituted for the $SB_{Hi}$ register 51, and a present character position register for $Y_{i\ max}$ register 52, with the threshold register 54 adjusted for one-half a character spacing.

The invention also provides editing flexibility with the same circuitry. Since a deletion line through a word is different than any other character, it can readily be uniquely or distinctly recognized and specially coded and deleted from the reassembled or collated code symbol stream output of the computer 12 at 12'', with the space occupied by the edited region omitted. Insertions or substitutions preferably interlineated just below or just above the line (and preceded and followed by a distinctive mark such as a slash) can be readily inserted in the code stream since they occur within the ½ line separation and are recognized by special code symbols, indicating an insertion intended in the line. In FIG. 8, for example, the detection of a special code for an editing mark indicating, for example, a "rub out" of a word, character or group of characters, may be stored in a register 160. The "rub out" instruction may be applied to a subtractor 161 to which the input character code is fed. The collated character symbol may be through-putted in FIG. 8A or applied to a line buffer 162, depending upon the position of switch S10, under the control of such special editing code symbols and the like. Thus the collated stored character information may be outputted or transmitted with the edited words or characters omitted, or with special code instructions inserted in the output coded symbol stream that is reassembled into the desired reading sequence.

Added flexibility also exists in the post-processing editing functions such as selecting type, punctuation, etc. by special command signals at 12''''. A suitable circuit for performing this function, which also may be programmed into the computer 12, is presented in FIG. 9. The output character stream is there shown selectively connectable by switch S11 to terminals 180 through 185, respectively connected to the collated and edited character stream (180), or registers corresponding to special post-editing signals, such as "upper rail" or "lower rail" (181, 183), "quad center" or "quad left" (182, 185), or empty space (184), etc.

In the before-mentioned commercial apparatus embodying the invention, six vidicons of the RCA type 8134 were employed with scan areas, such as 2', that are 1.447 inches long, 1.026 inches tall and with an overlap of 0.187 inches. An active scanning frame of 352 lines was used in a frame time of 368 lines in 55.936 milliseconds and a frame rate of 17.85 frames per second. The memory 4 was the before-mentioned Fabritek core memory with 8192 words X16 bits/word. The sampling rate at 13 was 4MHz. The scanning speed was up to 700 words per minute for single-spaced English text, with one error in 3,000 characters scanned.

Further modifications will also occur to those skilled in this art and all such are considered to fall within the spirit and scope of the invention as defined in the appended claims.

What is claimed is:

1. In a machine-implemented process of character recognition and reading in which text comprising a font of humanly-readable, conventional-language, alphanumeric characters disposed in lines of characters of predetermined reading sequence on a sheet is scanned in line-by-line sequence to produce electrical code symbols corresponding to the scanned characters, a machine-implemented method of editing said text, that comprises detecting during said line-by-line scanning sequence a deletion editing line drawn through a plurality of said characters to indicate intended rub out thereof, detecting during said line-by-line scanning sequence, and in response to editing marks, an insertion to replace the characters to be rubbed out, said insertion comprising a plurality of said characters of said font interlineated between the line of characters containing said characters to be rubbed out and an adjacent line of said characters without regard for alignment with the characters to be rubbed out, said insertion being delimited at the beginning and end thereof by said editing marks, producing distinctive electrical code symbols corresponding to the insertion characters delimited by said editing marks, and transmitting the character code symbols in the said predetermined reading sequence but with the code symbols corresponding to the rubbed out characters replaced by the code symbols corresponding to the insertion characters.

* * * * *